United States Patent
Leonov

(10) Patent No.: US 11,162,598 B2
(45) Date of Patent: Nov. 2, 2021

(54) CHECK VALVE

(71) Applicant: OKLAS TECHNOLOGIES LIMITED LIABILITY COMPANY, Moscow (RU)

(72) Inventor: Vyacheslav Vladimirovich Leonov, Moscow (RU)

(73) Assignee: ORLAS TECHNOLOGIES LIMITED LIABILITY COMPANY, Moscow (RU)

( * ) Notice: Subject to any disclaimer, the term of this patent is extended or adjusted under 35 U.S.C. 154(b) by 0 days.

(21) Appl. No.: 16/612,427

(22) PCT Filed: Sep. 6, 2018

(86) PCT No.: PCT/RU2018/050106
§ 371 (c)(1),
(2) Date: Nov. 11, 2019

(87) PCT Pub. No.: WO2019/009769
PCT Pub. Date: Jan. 10, 2019

(65) Prior Publication Data
US 2020/0063878 A1 Feb. 27, 2020

(51) Int. Cl.
*F16K 15/04* (2006.01)

(52) U.S. Cl.
CPC .......... *F16K 15/04* (2013.01); *F16K 2200/30* (2021.08)

(58) Field of Classification Search
CPC ................. F16K 15/04; F16K 27/0245; Y10T 137/7911; Y10T 137/7912; Y10T 137/7868
See application file for complete search history.

(56) References Cited

U.S. PATENT DOCUMENTS 1,621,889 A * 3/1927 Larkin .................... F16K 15/04
137/533.13
1,658,424 A * 2/1928 Yerkes .................... F16K 15/04
137/533.11

(Continued)

FOREIGN PATENT DOCUMENTS

RU 2233996 C2 8/2004
RU 100579 U1 12/2010

(Continued)

*Primary Examiner* — Kenneth Rinehart
*Assistant Examiner* — Nicole Gardner
(74) *Attorney, Agent, or Firm* — Nixon & Vanderhye PC

(57) ABSTRACT

The invention relates to petroleum engineering, and more particularly to the design of a check valve that can be used in conjunction with downhole sucker-rod pumps or electric centrifugal pumps primarily intended for pumping fluids with a high solid particle content. A ball check valve comprises: a hollow cylindrical housing having an internal annular protrusion; a valve pair mounted inside said housing and being in the form of an annular seat and a ball locking member; and a means for limiting the movement of the closure member, which is in the form of a cage with through holes for fluid flow. Between the seat and the cage there is mounted an annular elastic member, the inner diameter of which is not greater than the diameter of the ball locking member. The annular elastic element performs a dual function: when closing the valve provides additional pressing of the ball locking element to the seat due to the arising elastic forces; and provides additional sealing. Also, in the open position, additional forces do not act on the ball locking element, which reduces the hydraulic resistance of the valve. Thus, the use of an annular elastic element in the design of the check valve increases the valve life and increases its energy efficiency during operation.

6 Claims, 3 Drawing Sheets

(56) References Cited

U.S. PATENT DOCUMENTS

| | | | | | |
|---|---|---|---|---|---|
| 2,081,462 | A | * | 5/1937 | McClure | F16K 15/04 |
| | | | | | 137/329.04 |
| 2,252,924 | A | * | 8/1941 | Hale | F16K 15/04 |
| | | | | | 137/533.13 |
| 3,009,476 | A | * | 11/1961 | Usab | F16K 15/04 |
| | | | | | 137/516.29 |
| 3,346,008 | A | * | 10/1967 | Scaramucci | F16K 15/04 |
| | | | | | 137/516.29 |
| 3,561,822 | A | * | 2/1971 | Gaylord et al. | F04B 53/1002 |
| | | | | | 406/76 |
| 3,906,986 | A | * | 9/1975 | Zurit | B67D 1/04 |
| | | | | | 137/212 |
| 4,286,622 | A | * | 9/1981 | Ninomiya | F16K 15/04 |
| | | | | | 137/516.29 |
| 4,781,213 | A | * | 11/1988 | Kilayko | F16K 1/465 |
| | | | | | 137/516.27 |
| 5,593,292 | A | | 1/1997 | Kivey | |
| 5,797,426 | A | * | 8/1998 | Powell | F16K 15/04 |
| | | | | | 137/433 |

FOREIGN PATENT DOCUMENTS

| | | | |
|---|---|---|---|
| RU | 123482 | U1 | 12/2012 |
| RU | 158258 | U1 | 12/2015 |

\* cited by examiner

CHECK VALVE

FIELD OF THE INVENTION

The present invention relates to petroleum engineering, in particular to the design of the check valve, which can be used with sucker-rod or centrifugal pumps designed for pumping liquids with a high content of mechanical impurities.

BACKGROUND

Known are check valves described in patents for utility model RU55018, RU56940, RU70544, RU76380, RU83799, RU100579.

The main disadvantage of these devices is that during operation, when closing the valve, mechanical impurities contained in the formation fluid can interfere with the hermetic closure of the shut-off element, preventing it from being pressed firmly against the seat.

The closest in technical essence to the invention is a ball check valve, comprising a hollow cylindrical body with an internal annular protrusion, a valve pair installed in the body in the form of an annular seat and a ball locking element, the stroke limiter of the locking element in the form of a cage with through holes for fluid flow. The seat is mounted on one side of the annular protrusion at the valve inlet, and the cage on the other side of the annular protrusion. In the cage is additionally placed a spring interacting with the ball by means of an annular support element, mounted to press the ball against the seat (according to patent RU158258 publ. 27.12.15).

The disadvantage of this valve is that during operation of the pump, the valve is in the open position. The fluid flow compresses the spring, which increases the hydraulic resistance of the valve to the flow and reduces the energy efficiency of the pump.

SUMMARY OF THE INVENTION

The objective of the invention is to increase reliability and energy efficiency of the valve. The technical result is achieved by solving the above problems, is increase valve life and improved energy efficiency. The problem to which the invention is directed, is to increase the reliability and energy efficiency of the valve.

The technical result that is achieved as a result of solving the above problems, the result is in increasing the valve life and increasing energy efficiency during operation. This technical problem is solved by a ball check valve, comprising a hollow cylindrical housing with an internal annular protrusion, a valve pair installed in the housing in the form of a seat ring and a ball locking element, a stroke limiter of the locking element in the form of a cage with through holes for fluid flow, wherein an annular elastic element is mounted between the seat ring and the cage, and the inner diameter of the annular elastic element does not exceed the diameter of the ball locking element.

In some embodiments, the annular elastic element is made of a polymeric material. In some embodiments, the surface of the annular elastic element has a semicircular shape in longitudinal section. In some embodiments, the inner surface of the annular elastic element has a conical shape in longitudinal section. In some embodiments, a damper is installed in the upper part of the cage from a side of the ball locking element.

The annular elastic element performs a dual function:
when closing the valve provides additional pressing of the ball locking element to the seat due to the arising elastic forces;
provides additional sealing.

Also, in contrast to the prior art, in the open position, additional forces do not act on the ball locking element (an elastic force of the spring in the prototype, RU158258), which reduces the hydraulic resistance of the valve.

BRIEF DESCRIPTION OF THE DRAWINGS

The invention is illustrated by Figures, which depict.

DETAILED DESCRIPTION OF THE INVENTION

Figure 1:
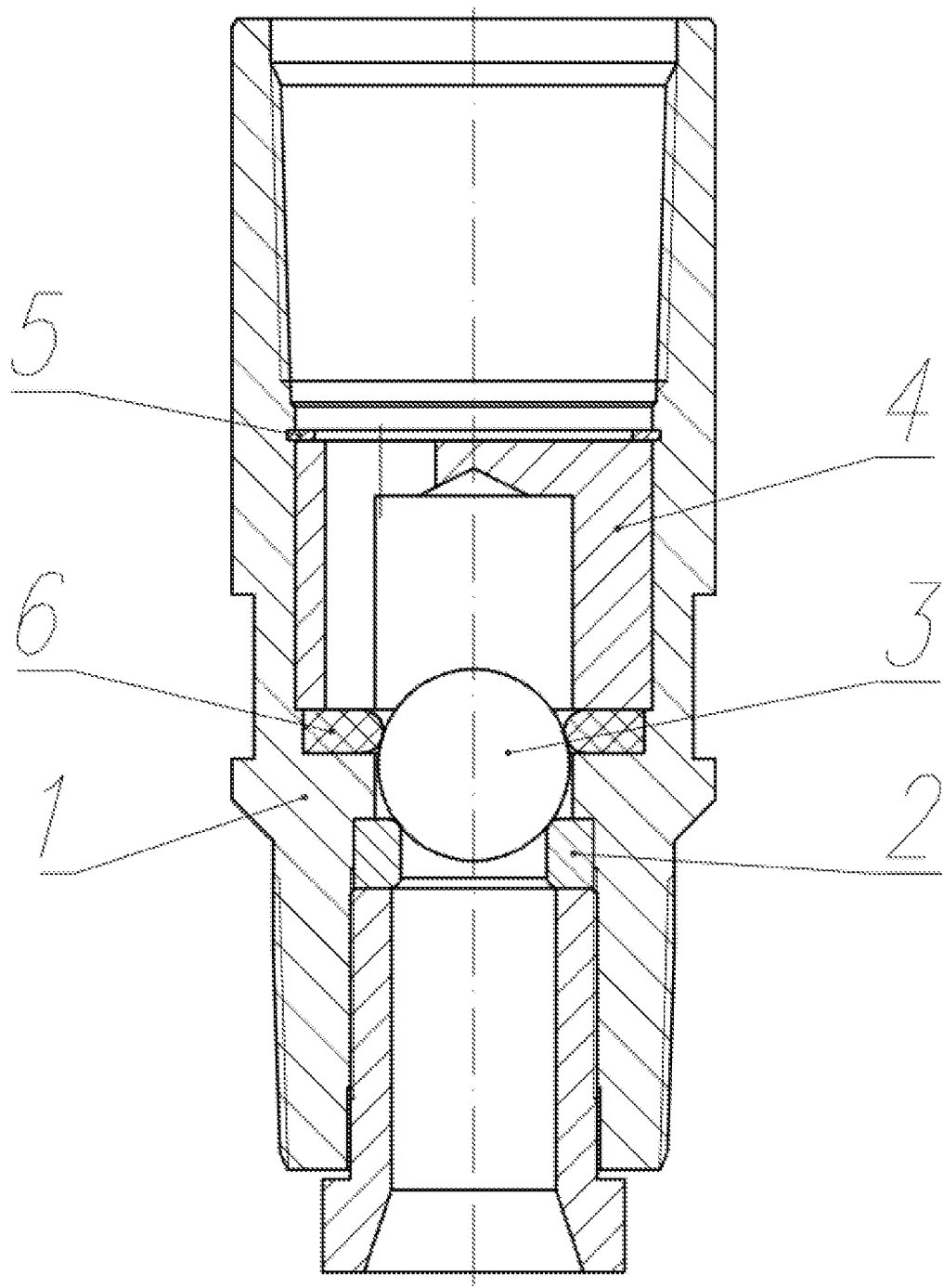
FIG. 1 shows a longitudinal section through a check valve with a semicircular elastic element.

In the preferred embodiment, the check valve (FIG. 1) contains the housing 1 in which a valve pair is mounted, consisting of the seat 2 and the ball locking element 3. The stroke limiter of the locking element is made in the form of the cage 4 with through holes for the fluid flow. The cage 4 is fixed in the housing by means of the retaining ring 5. Between the cage 4 and the seat 2 there is the annular elastic element 6 having a semicircular shape in longitudinal section.

Figure 2:
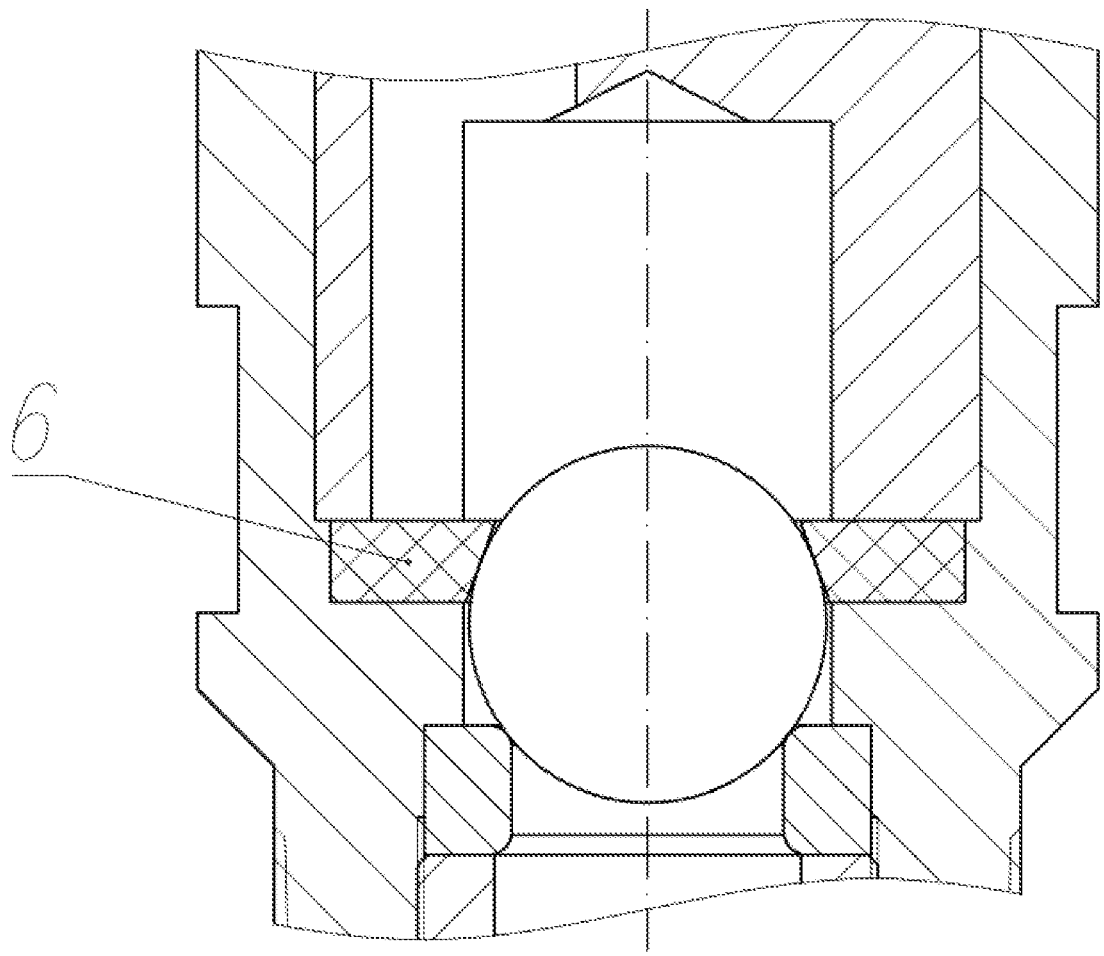
FIG. 2 shows an elastic element of a conical shape.
Figure 3:
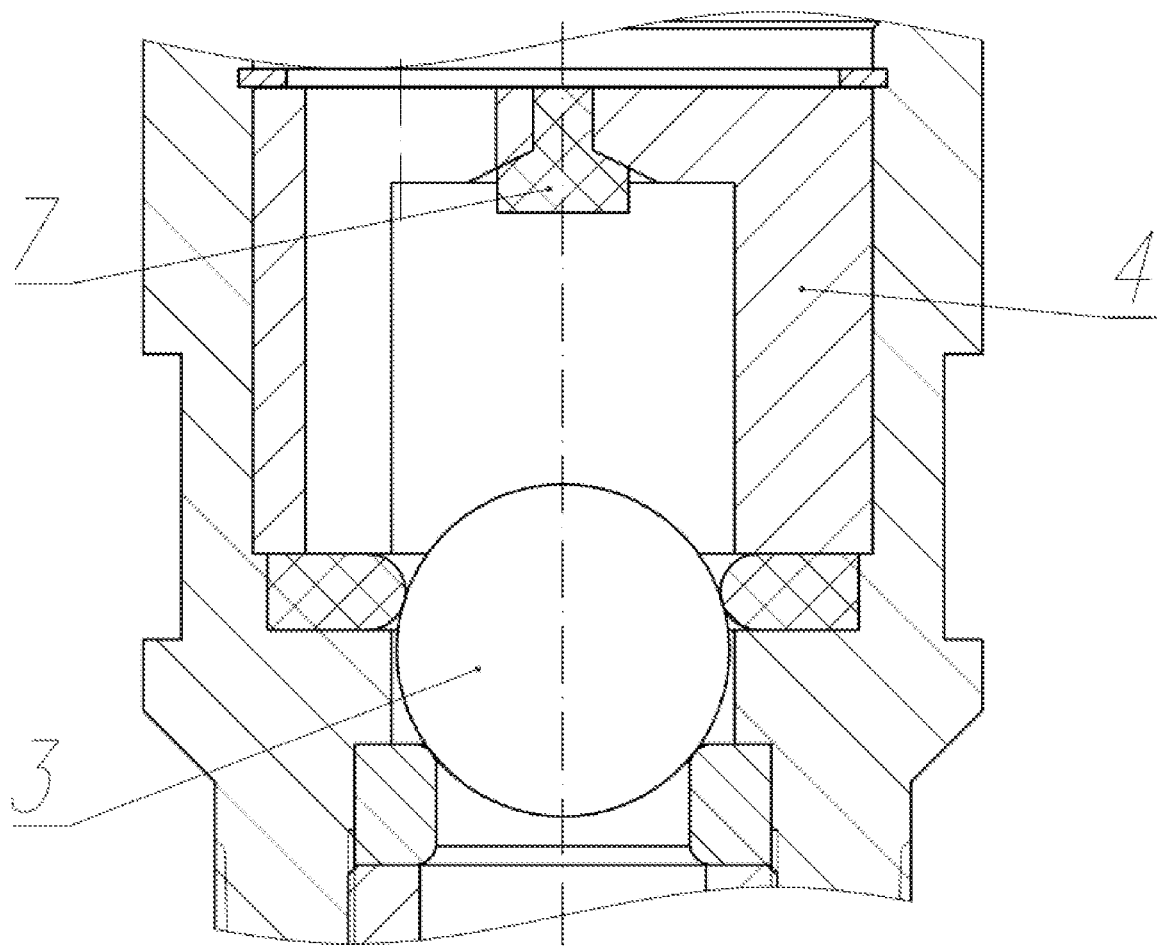
FIG. 3 shows a damping element.

FIG. 2 shows the elastic element 6 having a conical shape in longitudinal section. FIG. 3 shows the design of the valve with the damping element 7 mounted in the cage 4.

The check valve operates as follows. After the pump is turned on, pressure is created under the ball locking element 3 (FIG. 1), the ball locking element 3 rises from the seat 2 overcoming elastic forces from the annular elastic element 6, and moves upward along the cage 4, opening the valve for the passage of the pumped liquid. After the pump stops supplying liquid, the ball locking element 3 is lowered, pushed by the pressure of the liquid column through the annular elastic element 6 and sits in the seat 2, closing the valve. The annular elastic element 6 additionally presses the ball locking element 3 against the seat 2. To protect the cage 4 (FIG. 3) from a dynamic impact of the ball locking element 3 during opening of the valve, a damping element 7 is installed.

Thus, the use of an annular elastic element in the design of the check valve increases the valve life and increases its energy efficiency during operation.

The invention claimed is:
1. A ball check valve, comprising a hollow cylindrical housing with an internal annular protrusion, a valve pair installed in the housing in the form of a seat ring and a ball locking element, a stroke limiter of the ball locking element in the form of a cage with through holes for fluid flow, wherein an annular elastic element is mounted between the seat ring and the cage, and the inner diameter of the annular elastic element does not exceed the diameter of the ball locking element, and wherein the annular elastic element is configured to press the ball locking element toward the seat when the valve is in a closed position and the ball locking element contacts the seat.

2. The valve according to claim 1, wherein the annular elastic element is made of a polymeric material.

3. The valve according to claim 1, wherein an inner surface of the annular elastic element has a semicircular shape in longitudinal section.

4. The valve according to claim 1, wherein an inner surface of the annular elastic element has a conical shape in longitudinal section.

5. The valve according to claim 1, wherein a damper is installed in a part of the cage opposite from a side of the ball locking element.

6. The valve according to claim 1, wherein the valve does not include a spring that applies force the ball locking element when the valve is in an open position.

\* \* \* \* \*